June 10, 1930. J. F. FISK 1,763,460
VALVE MECHANISM FOR INTERNAL COMBUSTION ENGINES
Filed July 3, 1928
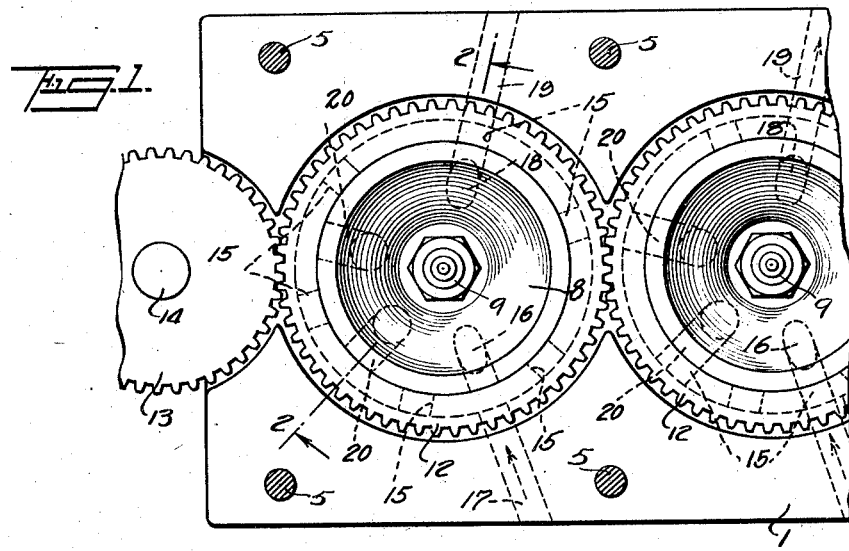
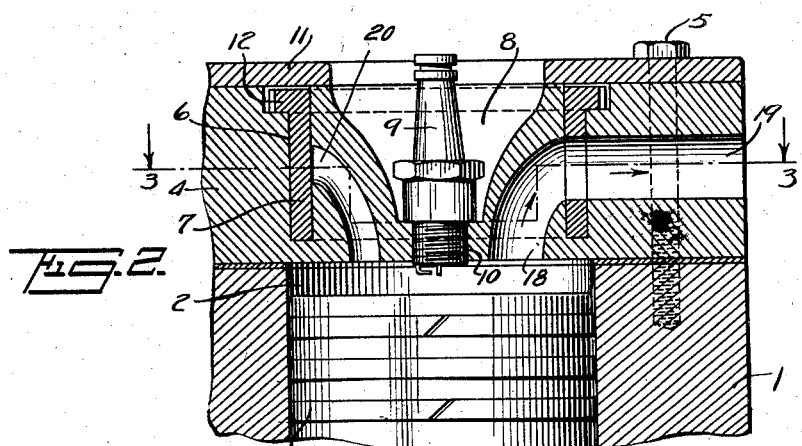
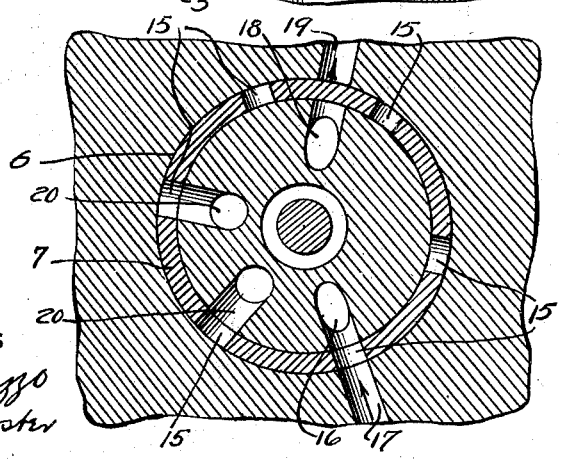
WITNESSES
INVENTOR
J. F. Fisk
BY
ATTORNEY Patented June 10, 1930

1,763,460

UNITED STATES PATENT OFFICE

JESSE FRANKLIN FISK, OF CHICAGO, ILLINOIS, ASSIGNOR OF ONE-HALF TO FRANK P. WALSH, OF NEW YORK, N. Y.

VALVE MECHANISM FOR INTERNAL-COMBUSTION ENGINES

Application filed July 3, 1928. Serial No. 290,078.

This invention relates to a valve mechanism for internal combustion engines, an object of the invention being to provide a rotating cylindrical valve having turning movement in the end of the cylinder controlling the inlet and exhaust and having equalizing ports whereby the pressure on the valve is balanced so as to insure a free turning movement without undue friction due to unbalanced pressure on the valve.

A further object is to provide a valve which is in the form of a vertically positioned sleeve mounted to turn in a circular groove in the head of the engine and held in place by a removable top plate, and having annular gear teeth or other devices thereon through the medium of which turning movement is imparted to the valve.

A further object is to provide an internal combustion engine with a valve of the type set forth which turns slowly when compared with the turning movement of the crank shaft, and, in the particular adaptation illustrated in the drawings and hereinafter described, the valve turns once during twelve complete revolutions of the crank shaft.

My invention is particularly adapted for use in connection with a four-cycle internal combustion engine and embodies many features of novelty and advantage, all of which will be more fully hereinafter described and pointed out in the claim.

In the accompanying drawings—

Figure 1 is a plan view of an engine block, with the top plate removed and the securing bolts in section, showing two valves, but it is of course to be understood that my invention is capable of use in connection with any desired number of valves and cylinders;

Figure 2 is a fragmentary view in vertical or longitudinal section on the line 2—2 of Figure 1;

Figure 3 is a view in transverse section on the line 3—3 of Figure 2.

1 represents a cylinder block which may have any desired number of cylinders 2 and I shall describe my invention in connection with a single cylinder with the understanding that the description will apply alike to any number of cylinders. 3 represents a reciprocating piston in the cylinder, and 4 a removable cylinder head which may be secured in place by bolts 5.

The head 4 above the cylinder 2 is made with a circular or annular recess or groove 6 in which my improved rotary sleeve valve 7 has a reasonably snug fit, and turns freely therein.

The cylinder head 4 may be centrally recessed, as shown at 8, and a spark plug 9 located in this recess may be secured in a screw-threaded opening 10 in the head. A removable plate 11 is secured on the head by means of the bolts 5 and confines the valve in operative position.

The valve 7 at its upper edge may be provided with an annular series of teeth, constituting a gear wheel 12, and the gear wheels 12 of the several cylinders may be intermeshed, as shown, and operated by a gear wheel 13 on a time shaft 14.

It is to be understood that my improved valve 7 is a slow moving valve as compared to the revolutions of the crank shaft, and it is provided with openings or ports 15 equally spaced apart. The ratio of the width of a port to the space between ports is one to three.

The ports 15 function both as inlet and exhaust ports and are adapted to register with an inlet port 16 in the head 4 registering with an inlet passage 17. Ports 15 are also adapted to register with an exhaust port 18 in the head registering with an exhaust passage 19 in the head.

In the particular valve illustrated I show six of these ports 15 and in such a construction the valve will turn once while the crank shaft is turning twelve times. In other words, the distance between one port and another is moved during a complete four-cycle operation of the engine.

The valve may of course be subdivided in other ways and six subdivisions are shown for purposes of illustration only.

During the compression and working strokes of the piston the passages 20 have their upper outer ends closed by the inner wall of the valve 7 so that pressure from the combustion chamber of the cylinder is exerted on the valve at these points and this pressure offsets the pressure exerted by the intake and exhaust passages against the valve at this time.

In operation, the engine functions as does any ordinary type of four-cycle engine, the exhaust gases being discharged through the port 18 and passage 19 and the fuel sucked in through the passage 17 and the port 16, and during the compression and explosion or working strokes both of these ports are closed.

My improved valve may be lubricated in any approved manner and the engine head and valve may of course be cooled in any way desired, and I do not wish to be limited to any specific mechanism or means for the purpose.

While I have illustrated a specific form of invention it is to be distinctly understood that I do not wish to be limited to details of construction but desire to cover the idea broadly as set forth in the appended claim.

I claim:

An internal combustion engine including a cylinder provided with a combustion chamber, a head, a rotating cylindrical valve mounted in the head, said head having intake and exhaust passages opening into the combustion chamber, said valve having a plurality of equally spaced ports adapted to be alined with the intake and exhaust passages, said head having valve balancing passages leading from the combustion chamber to the inner face of the valve and located between the intake and exhaust passages, the arrangement of the ports in the valve being such with respect to the intake and valve balancing passages that certain of the ports will be alined with the valve balancing passages when one of the ports is alined with the intake passage while being out of alinement when a port is alined with the exhaust passages.

JESSE FRANKLIN FISK.